(12) United States Patent
Fechner et al.

(10) Patent No.: US 7,470,642 B2
(45) Date of Patent: Dec. 30, 2008

(54) ALUMINOBOROSILICATE GLASS

(75) Inventors: Joerg Fechner, Mainz (DE); Peter Brix, Mainz (DE); Dirk Sprenger, Stadecken-Elsheim (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/692,275

(22) Filed: Mar. 28, 2007

(65) Prior Publication Data

US 2007/0243992 A1 Oct. 18, 2007

(30) Foreign Application Priority Data

Mar. 31, 2006 (DE) .................. 10 2006 016 256

(51) Int. Cl.
*C03C 3/091* (2006.01)
*C03C 3/087* (2006.01)
(52) U.S. Cl. .......................... 501/66; 501/70
(58) Field of Classification Search .................. 501/66, 501/67
See application file for complete search history.

(56) References Cited

U.S. PATENT DOCUMENTS

| 6,537,937 | B1 | 3/2003 | Nishizawa et al. |
| 2002/0032117 | A1 | 3/2002 | Peuchert et al. |
| 2002/0183188 | A1 | 12/2002 | Peuchert |

FOREIGN PATENT DOCUMENTS

| DE | 100 00 836 A1 | 7/2001 |
| DE | 100 64 804 A1 | 7/2002 |
| WO | WO 02/060831 A2 | 8/2002 |

*Primary Examiner*—Jerry Lorengo
*Assistant Examiner*—Kevin M Johnson
(74) *Attorney, Agent, or Firm*—Harness, Dickey & Pierce, P.L.C.

(57) ABSTRACT

An aluminoborosilicate glass having a density less than 2.40 $g/cm^3$ and a specific modulus of elasticity greater than 30 $GPa \cdot cm^3 \cdot g^{-1}$ is disclosed that comprises the following components (in wt. %): $SiO_2$ 58-70, $Al_2O_3$ 12-20, $B_2O_3$ 5-15, MgO 0-9, CaO 2-12, BaO 0, 1-5, $SnO_2$ 0-1, $As_2O_3$ 0-2, the glass, apart from random impurities, being free of SrO and free of alkali oxides. The glass is particularly suitable as a substrate glass for LCD displays, for example.

15 Claims, No Drawings

ALUMINOBOROSILICATE GLASS

RELATED APPLICATIONS

This application claims priority of German patent application 10 2006 016 256.0, filed on Mar. 31, 2006, the contents of which are fully incorporated by reference herein.

BACKGROUND OF THE INVENTION

The invention relates to an aluminoborosilicate glass having a particularly low density and a high specific modulus of elasticity, and to advantageous uses of such a glass.

LCD displays are becoming increasingly widespread, not only as computer screens but also as large-format flat screens. TFT-LCD displays (active matrix thin-film transistor LCDs), especially, have low power consumption and are therefore used in many applications, for example in notebooks, in flatscreens, in digital cameras and the like. The display substrate usually consists of a glass plate in each case.

Such substrates must meet high standards. In addition to high thermal shock resistance and good resistance to the aggressive chemicals used in the production of flat screens, the glasses should also have a wide spectral range (VIS, UV), high transparency, and a low density in order to save weight. Furthermore, using them as a substrate material for integrated semiconductor circuitry, for example in TFT displays, requires that they be thermally adapted to the silicon thin-film material. When largely crystalline silicon layers are produced by high-temperature treatment at temperatures above 700° C., or by direct deposition in CVD processes, a substrate is required which has a low thermal expansion coefficient of less than $3.2 \cdot 10^{-6}$/K, if possible. Another condition for applications in the field of display and photovoltaics technology is the absence of alkali ions. Sodium oxide concentrations of below 1000 ppm resulting from production-related factors are still tolerable with regard to the "poisoning" effect resulting from the diffusion of $Na^+$ into the semiconductor layer.

However, for use in large-format displays, it is particularly essentially that the substrate has a high elasticity modulus, a low density and a high specific modulus of elasticity.

It is also desired that suitable glasses can be commercially produced in a cost-efficient manner and at a sufficient level of quality (no bubbles, knots or occlusions), for example in a float glass plant or in a down-draw process. The production in drawing processes of thin (<1 mm), streakless substrates of low surface waviness, especially, requires that the glass have a high devitrification stability. In order to counteract any disadvantageous compaction of the substrate on the semiconductor microstructure during production, particularly in the case of TFT displays, the glass also needs to have a suitable temperature-dependent viscosity curve. This means that, as far as its thermal process and form stability are concerned, it should have a viscosity in the melting and processing range which is not too high, yet also have a sufficiently high transformation temperature, i.e. $T_g \geq 700°$ C.

Many glasses used especially for displays such as LCDs and TFT-LCDs are described in the prior art.

A number of alkali-free aluminoborosilicate glasses are known from WO 02/060831 which have a relatively low density of less than 2.4 g/cm³ in some cases, but a specific modulus of elasticity that is always below 30 $GPa \cdot g^{-1} \cdot cm^3$.

Other alkali-free aluminoborosilicate glasses are known from DE 100 00 836 A1, but these all have a density greater than 2.4 g/cm³, which is considered disadvantageous in portable applications, especially, such as notebooks.

A number of other aluminoborosilicate glasses for such applications and which have a high modulus of elasticity and a high specific modulus of elasticity are known from U.S. Pat. No. 6,537,937 B1.

However, the transformation temperature of these glasses is less than 700° C. in all cases, which is considered disadvantageous.

Other glasses of a similar kind are known from U.S. Pat. No. 5,851,939; U.S. Pat. No. 6,060,168; DE 100 64 804 A1; U.S. Pat. No. 6,319,867 B1; EP 0 672 629 A2; DE 196 80 967 T1; JP 2004-91244 A; and from JP 08-295530 A.

However, all of these fail to meet the requirements referred to at the beginning.

SUMMARY OF THE INVENTION

It is a first object of the invention to disclose an alkali-free alumino-borosilicate glass that has a low a density and a high specific modulus of elasticity.

It is a second object of the invention to disclose an alkali-free alumino-borosilicate glass that is particularly suitable for use in the production of displays, especially, such as LCD displays.

It is a third object of the invention to disclose an alkali-free alumino-borosilicate glass that has a viscosity characteristic that is optimized for the manufacture of displays.

According to the invention these and other objects are accomplished by an aluminoborosilicate glass having a density less than 2.40 g/cm³ and a specific modulus of elasticity greater than 30 $GPa \cdot cm^3 \cdot g^{-1}$ and comprising the following components (in wt. %):

| | |
|---|---|
| $SiO_2$ | 58-70 |
| $Al_2O_3$ | 12-20 |
| $B_2O_3$ | 5-15 |
| MgO | 0-<6 |
| CaO | 2-12 |
| BaO | 0.1-5 |
| $SnO_2$ | 0-1 |
| $As_2O_3$ | 0-2, | the glass, apart from random impurities, being free of SrO and free of alkali oxides. Preferably, aside from random impurities, no other components are contained in the glass.

It has been found that, by adding barium oxide in the simultaneous absence of strontium oxide, a very low density can be achieved, on the one hand, as well as a high specific modulus of elasticity, on the other hand. The special requirements in respect of the viscosity curve and a high transformation temperature are also fulfilled.

Surprisingly, a low density of less than 2.4 g/cm³ is obtained, despite the presence of barium oxide, which helps in turn to achieve a high modulus of elasticity and a high specific modulus of elasticity.

In a preferred development of the invention, the calcium oxide content is less than 6 wt.-%, but is at least 4 wt.-%.

The magnesium oxide content is preferably more than 0.5% because this likewise increases the modulus of elasticity. The meltability is also increased by the addition of MgO, in that the viscosity of the glass at $10^4$ dPas (referred to as VA), is reduced by higher concentrations of magnesium oxide.

However, the magnesium oxide content should not exceed 6 wt.-%.

According to another development of the invention, the $B_2O_3$ content is less than 14 wt.-%.

Since the glass is preferably free of strontium oxide and free of alkali oxides, the strontium oxide content should be less than 0.1 wt. % and preferably less than 0.02 wt. %. The alkali oxide content is preferably less than 0.1 wt. % and preferably less than 0.02 wt. %.

The glasses according to the invention preferably have a specific modulus of elasticity which is greater than 31 $GPa \cdot cm^3 \cdot g^{-1}$ and preferably greater than 32 $GPa \cdot cm^3 \cdot g^{-1}$.

In addition, the glasses according to the invention preferably have a modulus of elasticity which is greater than 71 GPa, preferably more than 73 GPa, and it is particularly preferred that the modulus of elasticity is greater than 75 GPa.

The viscosity temperature at $10^4$ dPas of the glasses according to the invention is preferably less than 1320° C., and the viscosity temperature at $10^2$ dPas is preferably less than 1690° C.

The glasses according to the invention preferably all have a transformation temperature $T_g$ of at least 700° C.

The glasses according to the invention are suitable preferably as substrate glasses, especially for OLEDs, AMOLEDs (active matrix OLEDs), FEDs (field emission displays), SEDs (surface emission displays), as filter glass, in particular as color filter glass, or as color glass.

The glasses according to the invention are also suitable for LCD-TFT displays, in particular, for displays with backlighting of flat screen displays in non-self-emitting systems, in particular as flat glasses for FFLs (flat fluorescent lamps), particularly for EEFL (external electrode fluorescent lamp) systems with external electrodes.

Within this context, the dielectric properties of the glass acquire special importance. The glasses according to the invention have a low tanδ/∈' quotient (dielectric loss angle/dielectric constant).

The glasses according to the invention can preferably be produced by the float process. The glasses according to the invention glasses are also suitable for a production process using the down-draw process and in particular using the overflow fusion process.

It is self-evident that the features of the invention as mentioned above and to be explained below can be applied not only in the combination specified in each case, but also in other combinations or in isolation, without departing from the scope of the invention.

Additional features and advantages derive from the following description of preferred embodiments.

DETAILED DESCRIPTION OF A PREFERRED EMBODIMENT

EXAMPLE

The glasses according to the invention preferably have the following composition (in wt. %):

| | |
|---|---|
| $SiO_2$ | 58-65 |
| $Al_2O_3$ | 15-18 |
| $B_2O_3$ | 8-12 |
| MgO | 0.5-5 |
| CaO | 4-<6 |
| BaO | 0.1-2 |

-continued

| | |
|---|---|
| $SnO_2$ | 0-1 |
| $As_2O_3$ | 0-2. |

Table 1 shows the composition of glass (Example 1) according to the invention and its characteristic properties. Table 1 also shows, as comparative example V1, a glass that does not belong to the invention which is free of barium oxide and contains strontium oxide instead. It is found that, although this comparative example V1 has a density less than 2.4 $g/cm^3$, the specific modulus of elasticity is less than 30 $GPa \cdot cm^3 \cdot g^{-1}$.

The glass according to the invention has a barium oxide content of 1.0 wt. %, is free of strontium oxide (and alkali oxides) and has a specific modulus of elasticity greater than 30 $GPa \cdot cm^3 \cdot g^{-1}$, and a density less than 2.4 $g \cdot cm^{-3}$. Furthermore, the transformation temperature $T_g$ of the glasses according to the invention glasses is more than 710° C., whereas the temperature when the viscosity of the glasses is $10^4$ dPas is less than 1320° C., and the viscosity temperature at $10^2$ dPas is less than 1670° C. The coefficient of thermal expansion, at $3.11 \cdot 10^{-6}$/K, is also in a preferred range.

TABLE 1

| | Example | |
|---|---|---|
| Composition (wt.-%) | 1 | V1 |
| $SiO_2$ | 63.40 | 63.7 |
| $Al_2O_3$ | 16.90 | 16.1 |
| $B_2O_3$ | 9.90 | 10.3 |
| MgO | 2.80 | 0.2 |
| CaO | 5.90 | 7.8 |
| BaO | 1.00 | — |
| $SnO_2$ | 0.20 | — |
| $As_2O_3$ | — | 1.1 |
| α ($10^{-6}$/K) (20-300° C.) | 3.11 | 3.21 |
| $T_g$ (° C.) | 719 | 716 |
| κ (kg · $m^{-3}$) | 2394 | 2367 |
| $T_4$ (° C. at $10^4$ dPas) | 1312 | 1330 |
| $T_2$ (° C. at $10^2$ dPas) | 1678 | 1717 |
| Modulus of elasticity (GPa) | 79 | 70 |
| Specific modulus of elasticity ($GPa \cdot cm^3 \cdot g^{-1}$) | 33.0 | 29.4 |

The invention claimed is:

1. An aluminoborosilicate glass having a density less than 2.40 $g/cm^3$ and comprising the following components (in wt. %):

| | |
|---|---|
| $SiO_2$ | 58-70 |
| $Al_2O_3$ | 12-20 |
| $B_2O_3$ | 5-15 |
| MgO | 0-9 |
| CaO | 2-12 |
| BaO | 0.1-5 |
| $SnO_2$ | 0-1 |
| $As_2O_3$ | 0-2, | said glass, apart from random impurities, being free of SrO and free of alkali oxides;
said glass further having a specific modulus of elasticity greater than 31 $GPa \cdot cm^3 \cdot g^{-1}$, a modulus of elasticity greater than 71 GPa, a glass transition temperature Tg of at least 710° C., a viscosity temperature of less than 1320° C. at $10^4$ dPas, and a viscosity temperature of less than 1690° C. at $10^2$ dPas.

2. The aluminoborosilicate glass of claim 1, in which the modulus of elasticity is greater than 75 GPa.

3. The aluminoborosilicate glass of claim 1, in which the specific modulus of elasticity is greater than 31 GPa·cm$^3$·g$^{-1}$.

4. The aluminoborosilicate glass of claim 1, in which the specific modulus of elasticity is greater than 32 GPa·cm$^3$·g$^{-1}$.

5. The aluminoborosilicate glass of claim 1, in which the modulus of elasticity is greater than 71 GPa.

6. The aluminoborosilicate glass of claim 1, in which the modulus of elasticity is greater than 73 GPa.

7. The aluminoborosilicate glass of claim 1, having a viscosity temperature less than 1320° C. at 10$^4$ dPas.

8. The aluminoborosilicate glass of claim 1, having a transformation temperature $T_g$ of at least 700° C.

9. The aluminoborosilicate glass of claim 1, having a transformation temperature $T_g$ of at least 710° C.

10. The aluminoborosilicate glass of claim 1, in which the CaO content is less than 6% by weight, but at least 4% by weight.

11. The aluminoborosilicate glass of claim 1, in which the MgO content is less than 6% by weight.

12. The aluminoborosilicate glass of claim 1, in which the MgO content is more than 0.5% by weight.

13. The aluminoborosilicate glass of claim 1, in which the B$_2$O$_3$ content is less than 14% by weight.

14. The aluminoborosilicate glass of claim 1, in which the SrO content is less than 0.02% by weight.

15. An aluminoborosilicate glass having a density less than 2.40 g/cm$^3$ and comprising the following components (in wt. %):

| | |
|---|---|
| SiO$_2$ | 58-70 |
| Al$_2$O$_3$ | 12-20 |
| B$_2$O$_3$ | 5-<14 |
| MgO | 0.5-6 |
| CaO | 4-6 |
| BaO | 0.1-5 |
| SnO$_2$ | 0-1 |
| As$_2$O$_3$ | 0-2, | said glass, apart from random impurities, being free of SrO and free of alkali oxides;

said glass further having a specific modulus of elasticity greater than 31 GPa·cm$^3$·g$^{-1}$, a modulus of elasticity greater than 71 GPa, a glass transition temperature $T_g$ of at least 710° C., a viscosity temperature of less than 1320° C. at 10$^4$ dPas, and a viscosity temperature of less than 1690° C. at 10$^2$ dPas.

* * * * *